(12) United States Patent
Hafner et al.

(10) Patent No.: US 11,087,484 B2
(45) Date of Patent: Aug. 10, 2021

(54) CAMERA APPARATUS AND METHOD OF DETECTING A STREAM OF OBJECTS

(71) Applicant: SICK AG, Waldkirch (DE)

(72) Inventors: Carl Hafner, Waldkirch (DE); Stephan Walter, Waldkirch (DE)

(73) Assignee: SICK AG, Waldkirch (DE)

( * ) Notice: Subject to any disclaimer, the term of this patent is extended or adjusted under 35 U.S.C. 154(b) by 87 days.

(21) Appl. No.: 16/043,292

(22) Filed: Jul. 24, 2018

(65) Prior Publication Data

US 2019/0073785 A1 Mar. 7, 2019

(30) Foreign Application Priority Data

Sep. 6, 2017 (EP) ..................................... 17189567

(51) Int. Cl.
*G06K 9/00* (2006.01)
*G06T 7/62* (2017.01)
(Continued)

(52) U.S. Cl.
CPC ................ *G06T 7/62* (2017.01); *G06K 9/342* (2013.01); *G06T 3/0068* (2013.01);
(Continued)

(58) Field of Classification Search
CPC ........... G06T 7/62; G06T 7/194; G06T 7/174; G06T 3/0068; G06T 7/11; G06T 7/33;
(Continued)

(56) References Cited

U.S. PATENT DOCUMENTS 6,236,735 B1 * 5/2001 Bjorner ................ G06K 9/2018
250/559.44
9,599,459 B1 * 3/2017 Janicki .................. G06T 7/0004
(Continued)

FOREIGN PATENT DOCUMENTS

EP 1645839 B1 8/2007
EP 2546776 B1 6/2013
(Continued)

OTHER PUBLICATIONS

Shah, et al., "Removal of specular reflections from image sequences using feature correspondences", Machine Vision and Applications, Feb. 18, 2017, pp. 409-420.
(Continued)

*Primary Examiner* — Solomon G Bezuayehu
(74) *Attorney, Agent, or Firm* — Nath, Goldberg & Meyer; Jerald L. Meyer (57) ABSTRACT

A camera apparatus is provided for detecting a stream of objects moving relative to the camera apparatus having a plurality of individual cameras that each have an image sensor for recording frames, wherein the frames overlap one another in part, having an evaluation unit for compiling frames, and having a geometry detection sensor for detecting geometrical data of the objects. The evaluation unit is here configured to generate an object image assembled from frames of an individual object of the stream of objects, with the selection of the participating frames and/or the assembly taking place on the basis of the geometrical data.

17 Claims, 4 Drawing Sheets

(51) Int. Cl.
| | |
|---|---|
| *G06T 3/60* | (2006.01) |
| *G06T 3/40* | (2006.01) |
| *G06T 7/00* | (2017.01) |
| *G06K 9/34* | (2006.01) |
| *G06T 7/33* | (2017.01) |
| *G06T 7/11* | (2017.01) |
| *G06T 3/00* | (2006.01) |
| *G06T 7/174* | (2017.01) |
| *G06T 7/194* | (2017.01) |

(52) U.S. Cl.
CPC ............ *G06T 3/4038* (2013.01); *G06T 3/60* (2013.01); *G06T 7/0004* (2013.01); *G06T 7/11* (2017.01); *G06T 7/174* (2017.01); *G06T 7/194* (2017.01); *G06T 7/33* (2017.01); *G06T 2200/04* (2013.01); *G06T 2200/32* (2013.01); *G06T 2207/10021* (2013.01); *G06T 2207/10028* (2013.01); *G06T 2207/20132* (2013.01); *G06T 2207/20221* (2013.01); *G06T 2207/30112* (2013.01)

(58) Field of Classification Search
CPC ....... G06T 3/60; G06T 3/4038; G06T 7/0004; G06T 2207/10021; G06T 2200/04; G06T 2200/32; G06T 2207/20132; G06T 2207/30112; G06T 2207/20221; G06T 2207/10028; G06K 9/342
See application file for complete search history.

(56) References Cited

U.S. PATENT DOCUMENTS

| | | | |
|---|---|---|---|
| 2007/0110305 A1* | 5/2007 | Corcoran | G06K 9/00228 382/167 |
| 2007/0222781 A1* | 9/2007 | Kondo | G06T 15/506 345/426 |
| 2007/0237356 A1 | 10/2007 | Dwinell et al. | |
| 2014/0036135 A1* | 2/2014 | Gehring | H04N 5/23212 348/345 |
| 2015/0310242 A1* | 10/2015 | Wehrle | G06K 7/10811 235/470 |
| 2016/0253793 A1* | 9/2016 | Marrion | G06T 7/85 382/141 |
| 2018/0040150 A1* | 2/2018 | Saporetti | G06K 9/18 |
| 2018/0311704 A1* | 11/2018 | Gil | B07C 3/08 |
| 2018/0334100 A1* | 11/2018 | Tschirhart | G06K 9/00805 |
| 2018/0374239 A1* | 12/2018 | Wallack | H04N 13/246 |
| 2020/0007720 A1* | 1/2020 | Ilic | H04N 5/232945 |

FOREIGN PATENT DOCUMENTS

| | | |
|---|---|---|
| EP | 2693363 A1 | 2/2014 |
| EP | 2693364 A1 | 2/2014 |

OTHER PUBLICATIONS

European office action dated Feb. 19, 2018 for corresponding application No. 17189567.5.

* cited by examiner

CAMERA APPARATUS AND METHOD OF DETECTING A STREAM OF OBJECTS

FIELD

The invention relates to a camera apparatus and to a method of detecting a moving stream of objects moving relative to the camera apparatus in which individual images each cover part of the width of the stream and overlap one another.

BACKGROUND

Sensors are used for the automation of processes at a conveyor belt to detect object properties of the conveyed objects and to initiate further processing steps in dependence thereon. The processing in logistics automation typically comprises a sorting; for instance in automatic parcel identification, for mail shipments, or for baggage handling at airports. In addition to general information such as the volume and weight of the objects, an optical code applied to the object frequently serves as the most important source of information. In other cases, it is a question of an inspection or of a quality check in which an optical code can, but does not have to, participate.

As digital camera technology develops further, camera-based code readers are increasingly used for code reading. Instead of scanning code regions such as in a barcode scanner, a camera-based code reader records images of the objects having the codes located thereon with the aid of a pixel-resolved image sensor and image evaluation software extracts the code information from these images. Camera-based code readers also cope without problem with different code types than one-dimensional barcodes which also have a two-dimensional structure like a matrix code and which provide more information. In an important application group, the objects bearing the code are conveyed past the code reader. A camera reads the object images having the code information successively with the relative movement.

An individual sensor is often not sufficient to record all the relevant information on the objects on a conveying belt. A plurality of sensors are therefore combined in a reading system or a reading tunnel. If a plurality of conveyor belts are disposed next to one another to increase the object throughput or if a widened conveyor belt is used, a plurality of sensors mutually complement one another with respect to their fields of view, which are narrow per se, to cover the total width. In addition, sensors are installed at different perspectives to record codes from all sides (omnidirectional reading).

The reading system provides the detected information such as code contents and images of the object stream to a master control. These images are used, for example, for an external character recognition, a visualization, or a manual postprocessing (video coding). Difficulties result if a plurality of sensors are now arranged next to one another to cover a wider reading region. Image processing methods are known in principle from the literature which join images from a plurality of sources ("image stitching"). Such methods work solely with the image data and this becomes complex with a larger number of participating sensors, particularly since the success and quality of the stitching then greatly depend on the image data.

It is therefore not easily possible to obtain an object image of the respective objects on the conveyor belt that can be transferred to the master control. It is practically not possible simply to implement the individual images (frames) of the participating sensors as such in the master control since the data volume would be huge. In addition, the master control would then have to deal with the problem of stitching frames to one object image that would thus only be displaced.

A further sensor is often arranged upstream of the actual sensors, that is, for example, the camera-based code readers, in the prior art to detect or to measure the objects in advance. With respect to an object, not only the content of the codes located thereon, but also its volume can thus be transmitted to the master control, for example. An object image of the individual objects is thereby still not available to the master control.

EP 1 645 839 B1 discloses an apparatus for monitoring moving objects at a conveyor belt which has an upstream distance-measuring laser scanner for detecting the geometry of objects on the conveyor belt and which has a line scan camera. Object regions are recognized as regions of interest (ROIs) on the basis of the data of the laser scanner and the evaluation of the image data of the line scan camera is restricted to these regions of interest. The stitching of image data of code readers arranged next to one another is not provided here.

A plurality of line-based code readers are accommodated next to one another in a common housing in EP 2 546 776 B1 and their image lines are joined together to form a common image. A laser scanner attached above the code readers with respect to the conveying direction measures the height contour of the objects beforehand to recognize objects as individual objects, to mark empty conveyor belt regions as of no interest, or to carry out focusing settings. The data volume to be output for the respective total image is still very high. No provision is made in EP 2 546 776 B1 to generate images of individual objects and extracting them from the total image using image evaluation processes would still be very demanding and complex. In addition, the stitching of images is comparatively simple under the given conditions, namely of linear sensors adjusted in a known manner relative to one another.

EP 2 693 364 A1 deals with a further camera system that, together with a plurality of detection units recording in an overlapping manner, covers the total width of a stream of objects. Regions of interest, for example code regions, are identified for the assembly of the detected image data to a common image and a stitching seam is positioned such that the common image only includes image data of the same detection unit within a region of interest. A higher quality overall image of all the objects is thereby acquired in which code regions cannot become illegible due to the stitching seam. Images of individual objects are, however, not generated and this would again have to be done in a complex manner by segmentation in a subsequent image processing method.

SUMMARY

It is therefore the object of the invention to obtain improved output data of a camera system of the category in an efficient manner.

This object is satisfied by a camera apparatus and by a method of detecting a moving stream of objects moving relative to the camera apparatus in which individual images each cover part of the width of the stream and overlap one another. The camera apparatus comprises a plurality of individual cameras whose respective detection regions are not sufficient for a frame to cover the width of the object stream. The at least partly overlapping frames are joined together (image stitching). A geometry detection sensor, for example, generates geometrical data of the objects, for example object contours, by distance measurement in addition to the frames.

The invention starts from the basic idea of supporting the image processing of the frames by the geometrical data. To be able to output an object image of an individual object of the stream, the participating frames are selected on the basis of the geometrical data. The object image is therefore actually not cut out of a stitched overall image, as would also be subsequently conceivable in accordance with the prior art, but the object image is rather itself stitched from frames. Alternatively or additionally, the processing of stitching itself or the image fusion algorithm is also simplified by the geometrical data.

The invention has the advantage that valuable additional data can be output via the respective object image that are useful for diagnosis, visualization, postprocessing, and similar purposes ("offshore video coding"). A very robust and reliable stitching of frames to a respective object image is made possible due to the prior knowledge in the form of the geometrical data. The quality of the object images is high; sensitive regions such as code regions and address fields in particular remain legible. At the same time, the procedure is very efficient due to the utilization of the geometrical data and is thus even possible in real time if necessary since only frames have to be processed that actually participate in the object image and the image fusion and image processing can additionally be considerably simplified by means of the geometrical data.

The image sensors of the individual cameras are preferably matrix sensors and thus generate a two-dimensional image. The advantages of the invention then become particularly clear because the stitching of areal images permits more degrees of freedom and is therefore more complex. In principle, however, line scan cameras are also conceivable, for instance in the case of particularly wide conveyor belts that a single line scan camera also no longer covers.

The at least one geometry detection sensor is preferably a laser scanner or a 3D camera and detects a point cloud or distance map of the objects, with the geometrical data then being able to be further treated. The geometry detection sensor is preferably arranged above the individual cameras with respect to the direction of movement of the stream so that the geometrical data are available in advance. It is, however, also conceivable to integrate the geometry detection into the individual cameras, for example by a time of flight process or a stereo process.

The geometrical data preferably have an area circumscribing the individual object. The geometrical data are three-dimensional per se. A two-dimensional region is derived from this where the object is located from the point of view of the individual cameras. Such a region can be described by a few data points, for example as a polygon or preferably as a rectangle. Not only the data volume is thereby limited, but the utilization of the geometrical information in the selection of frames and/or their stitching is/are substantially simplified.

The geometrical data preferably describe the 3D contour of the individual object. The 2.5D point cloud or distance map of the geometry detection sensor can already be used for this purpose that are then tailored to the region of the object. It is, however, also conceivable to generate an object model as an edge model, for example, by indicating corner points, a triangulated network or a reconstructed surface of the individual object. Object images having irregular surfaces can be generated from the 3D contour to cancel the simplification to flat, two-dimensional object images. It is furthermore possible, provided that arrangements of individual cameras are available in a plurality of perspectives, to generate a real 3D model of the object together with textures from the individual objects to subsequently observe the object from different sides. Such a 3D model can be prepared for regularly and irregularly shaped objects.

The evaluation unit is preferably configured to localize the individual object on the basis of the geometrical data. To be able to output an object image that only shows a single object, a segmentation of the image data is conventionally required that is admittedly possible, but is very complex and prone to error. For example, object edges can only be recognized with difficulty with low contrast, for instance with a plurality of objects of similar color arranged close to one another. A segmentation on the basis of the geometrical data is in contrast considerably more simple and robust.

The evaluation unit is preferably configured to cut the object image to the individual object using the geometrical data. Even if only the correct frames that actually include parts of the object are used to assemble an object image, the object image arising therefrom by no means necessarily only includes the object itself. Cropping would per se only require localizing the object in the object field. This object is substantially simplified by using the geometrical data since the relevant image region can be immediately determined from the geometrical data independently of the image content or of a feature recognition. The object image can intentionally have a marginal region around the object so that the environment of the object remains recognizable.

The evaluation unit is preferably configured to rotate the object image into a standardized orientation using the geometrical data. With a parallelepiped object, for example, the object detected as a rectangle is thereby rotated in alignment with the horizontal or with the vertical. The actual orientation of the object and thus the required rotation is acquired in an extremely simple manner from the geometrical data.

The evaluation unit is preferably configured to equalize the object image perspectively with reference to the geometrical data. The required transformation is acquired from the geometrical data without having to analyze the image data for this purpose. In this case, unlike with a cropping or rotation of the object, it would not only be complex, but also even extremely difficult if not impossible to recognize perspectives to be corrected at all with image processing methods.

The evaluation unit is preferably configured to localize regions in the frames in which direct reflections can occur with reference to the geometrical data. Such reflections produce points in the frames which are partly heavily overexposed and which are actually disruptive in code reading. The geometrical data, however, allow the detection of when an object surface is aligned with respect to an individual camera such that such disruptive reflections are impending. Image data of another, overlapping frame without such disruptive overexposures are then preferably used for the respective image region in the image fusion.

The individual cameras are preferably arranged in a row, with the evaluation unit being configured to search for corresponding image features on the assembly of an object image with the aid of epipolar geometry in particular along epipolar lines. A preferred direction for image features belonging to one another is fixed on the basis of the linear arrangement of the individual cameras and this is utilized by a correspondence search restricted to epipolar lines that is thereby substantially accelerated and simplified. The individual cameras are preferably, in particular in the case of a real time search, mounted perpendicular to the direction of movement of the objects such that the epipolar lines are disposed along image lines of the image sensors. Furthermore, the individual cameras can be adjusted so precisely with respect to one another that the respective same pixel rows form an epipolar line or a residual offset is initially determined and then taken into account.

The evaluation unit is preferably configured to search for corresponding image features in a distance region on the assembly of an object image, said distance region being selected in dependence on the distance of the individual object derived from the geometrical data. In the overlap region, the identical features recorded by adjacent individual cameras are disposed closer together or further remote from one another depending on the height of the object. This height is, however, accessible through the geometrical data. The remaining geometrical circumstances, for instance the installation height of the individual cameras and their mutual spacings, are likewise known. A correspondence search can thereby be restricted to a small region. This accelerates the stitching and prevents errors because at most apparent correspondences are anyway recognized outside the corresponding window selected in dependence on the height of the objects.

The evaluation unit is preferably configured to place the stitching seam or stitching line of the object image in the overlap region of two frames through image regions that are as low in contrast as possible. Powerful image fusion algorithms, particularly such as assisted in accordance with the invention by geometrical data, are easily able also to generate high-quality image data in the transition region between two frames in an object image. It is nevertheless of advantage if any remaining distortion only relates to low-contrast regions where it has no or few effects. As little information as possible is thereby lost.

At least one individual camera is preferably configured as a camera-based code reader. Code information can thereby be read in the frames or in fused frames such as the object images. To avoid some codes only becoming legible after image fusion, the overlap regions of the individual cameras can be selected as so large that the codes to be read fit therein. Each code is then legible in at least one frame. Another way is the so-called code stitching. If a code is disposed in a transition region of frames, a decoding at the level of frames only produces partial results that are then, however, subsequently assembled to a total code content. A camera apparatus using code-reading individual cameras is a reading system or reading tunnel as explained in the introduction. In addition to the volume and the code content, an object image can, however, now also be output in accordance with the invention for each object.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
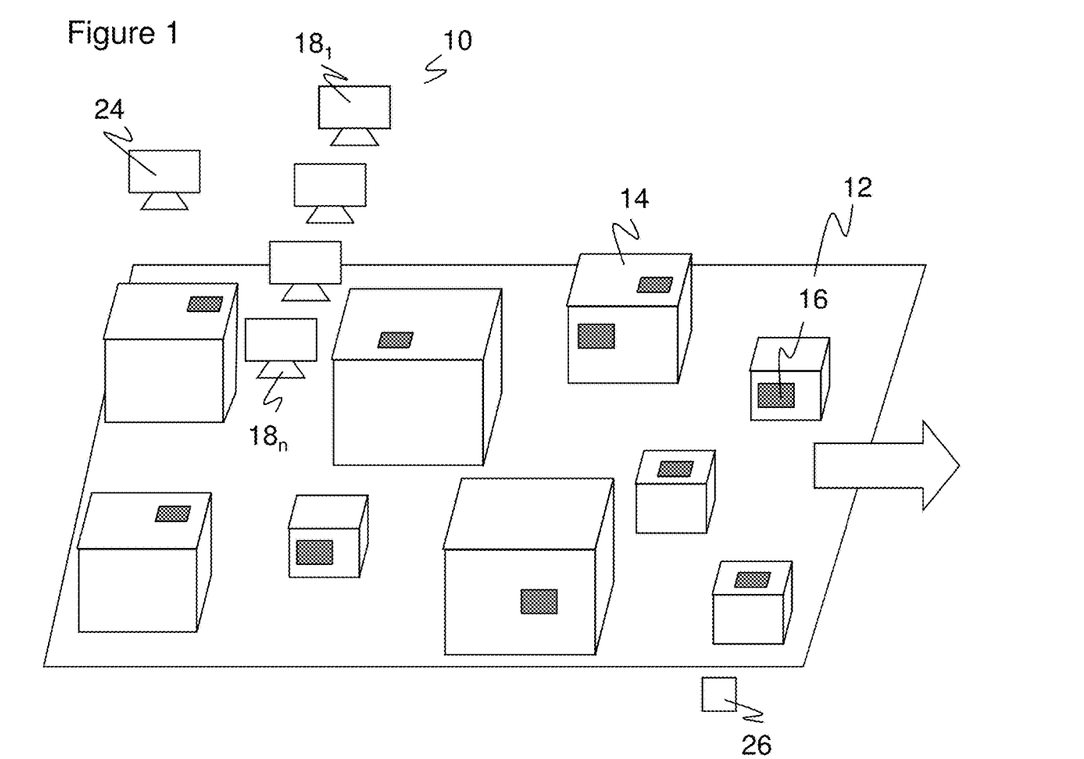
FIG. 1 a schematic three-dimensional view of a camera apparatus above a conveyor belt with objects to be detected.

FIG. 1 shows a schematic three-dimensional view of a camera apparatus 10 above a conveyor belt 12 having objects 14 to be detected on which codes 16 are attached by way of example, but not necessarily. The conveyor belt 12 is an example for the production of a stream of objects 14 which move relative to the stationary camera apparatus 10. Alternatively, the camera apparatus 10 can be moved or the objects 14 are moved with a stationary installation of the camera apparatus 10 by another means than the conveyor belt 12 or by their own movement. The camera apparatus 10 comprises a plurality of individual cameras $18_1 \ldots 18_n$, where n≥2 and n=4 by way of example in FIG. 1.

Figure 2:
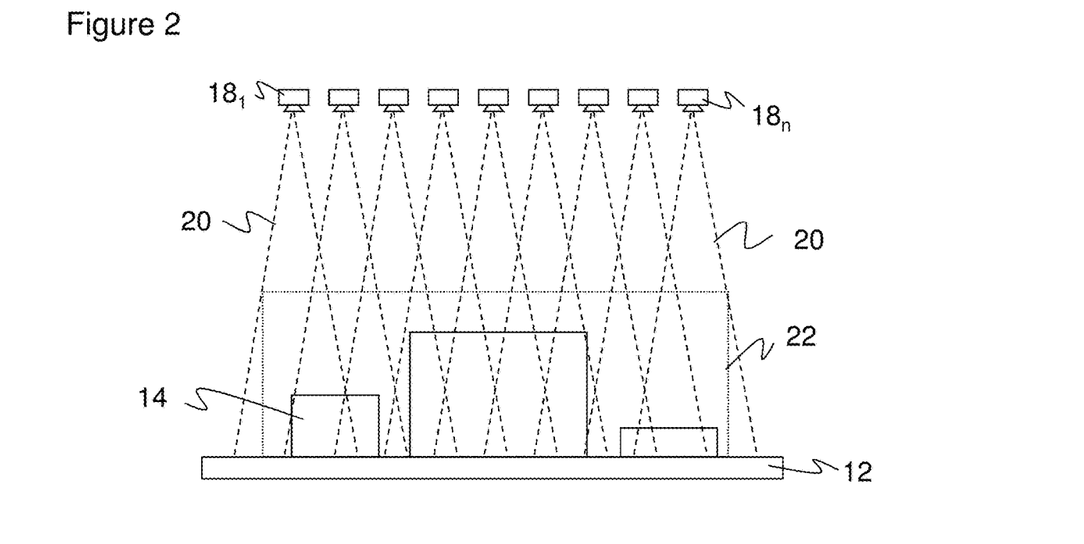
FIG. 2 a supplementary sectional representation of individual cameras of the camera apparatus with their fields of view.

FIG. 2 additionally shows the arrangement of the individual cameras $18_1 \ldots 18_n$ and their fields of view 20 above the conveyor belt 12 in a sectional representation. The camera apparatus 10 will be further explained with reference to FIGS. 1 and 2.

The individual cameras $18_1 \ldots 18_n$ each have an image sensor, not shown, having a plurality of light reception elements arranged to form a pixel row or a pixel matrix as well as an objective. The individual cameras $18_1 \ldots 18_n$ are preferably of the same design among one another to reduce the system complexity. They can, however, work with different recording parameters, and can in particular focus differently. The individual cameras $18_1 \ldots 18_n$ are arranged above the conveyor belt 12 in FIGS. 1 and 2. A different arrangement from the front, the rear, the side, the bottom or from an oblique intermediate direction is also conceivable. In addition, individual cameras $18_1 \ldots 18_n$ or arrangements thereof can be attached in a plurality of perspectives to detect additional sides of the objects 14, in particular when an object image still to be explained should be produced in the form of a 3D model of the detected objects 14.

In a preferred embodiment, the individual cameras $18_1 \ldots 18_n$ are configured as code readers that are additionally equipped with a decoding unit for reading code information and corresponding preprocessing for localizing and preparing code regions. It is also conceivable to detect streams of objects 14 without codes 16 and accordingly to dispense with the decoding unit itself or its use, for example for an inspection or quality control. In addition, a decoding can also take place on their image data downstream outside the individual cameras $18_1 \ldots 18_n$. The individual cameras $18_1 \ldots 18_n$ can be either separate cameras or detection units within the same camera.

The conveyor belt 12 is too wide to be detected by an individual camera $18_1 \ldots 18_n$. The fields of view 20 of the individual cameras $18_1 \ldots 18_n$ therefore overlap in the transverse direction of the conveyor belt 12 and consequently the respective frames generated by the individual cameras $18_1 \ldots 18_n$. The image data are therefore available redundantly in a plurality of frames in the overlap regions. This is utilized in a manner still to be explained to be able to assemble a common image somewhere within a working region 22, that covers the total relevant width of the conveyor belt 12. The degree of overlap of fields of view 20 and as a consequence of frames is variable in dependence on the embodiment. A complete overlap and thus high redundancy is thus in particular also imaginable, for example to record frames of sections of the objects 14 with different focal positions so that parts of objects disposed close to one another are not only detected in a blurred manner. Independently of the degree of overlap, a system composed of a plurality of individual cameras $18_1 \ldots 18_n$ has the advantage that, unlike with only one detection unit, now different focuses become possible over the total width in dependence on the height of the respective detected object 14 in the width section for which the respective individual camera $18_1 \ldots 18_n$ is responsible.

A geometry detection sensor 24, for example in the form of a distance-measuring laser scanner known per se whose detection region covers the whole conveyor belt 12 is arranged above the individual cameras $18_1 \ldots 18_n$ with respect to the direction of movement of the conveyor belt 12. The geometry detection sensor 24 measures the three-dimensional contour of the objects 14 on the conveyor belt 12 so that the camera apparatus 10 is already aware of the geometrical data of the objects 14, from which, for example, the dimensions, volume, position, and shape result, prior to the detection procedure of the individual cameras $18_1 \ldots 18_n$. In addition, the geometrical data can be used to focus the individual cameras $18_1 \ldots 18_n$ individually on the respective object height.

The geometrical data are preferably further processed for the generation of an object image explained in the following such that a polygon, in particular a rectangle, which surrounds the object 14, is included for each object 14. If a complete 3D model should be produced as the object image, geometrical data of the 3D contour of the objects 14 are correspondingly provided. For simplification, the object 14 can be bounded by a simple body, for instance a parallelepiped (bounding box). A segmentation of the objects 14 thus already takes place by means of the geometrical data independently of the image data of the individual cameras $18_1 \ldots 18_n$.

A laser scanner has a very large angle of view so that wide conveyor belts 12 can also be detected. Nevertheless, in another embodiment, additional geometry detection sensors can be arranged next to one another, also to reduce shadowing effects through different object heights. It is additionally conceivable to arrange additional laser scanners or other geometry detection sensors in further perspectives, that is not only from above as shown, to learn more about the 3D contours of the objects. Finally, in other embodiments, the geometry detection can be integrated into the individual cameras $18_1 \ldots 18_n$.

The individual cameras $18_1 \ldots 18_n$ are intrinsically calibrated, all the camera positions are known, and they are aligned either in parallel or at least in a known manner with respect to one another. Dynamic intrinsic camera parameters such as the focal position, the extrinsic camera parameters, and a time stamp of the recording time are preferably also known with respect to the respective frames of the individual cameras $18_1 \ldots 18_n$. Furthermore, the position and alignment of the geometry detection sensor 24 and the detection time of the geometrical data are known so that the geometrical data and the image data can be converted into a common coordinate system. To correctly take account of the thus known time relationship between geometrical data and image data, the advance or the speed of the conveyor belt 12 is monitored by an encoder 26. Alternatively, the conveyor belt 12 moves reliably with a known movement profile or corresponding information is transmitted to the camera apparatus 10 by a master control.

In many conventional reading systems, a triggering of the image recording or of the code reading is usual via an upstream light barrier or also a laser scanner. The camera apparatus 10 in accordance with the invention in contrast preferably works in a free-running mode in which continuous geometrical data and image data are detected. The objects 14 are therefore segmented out of the object stream with the help of the geometry detection sensor 24. As shown in FIG. 1, it is also permitted that objects 14 are disposed next to one another and even touch, which would present considerable difficulties in a triggered system.

Figure 3:
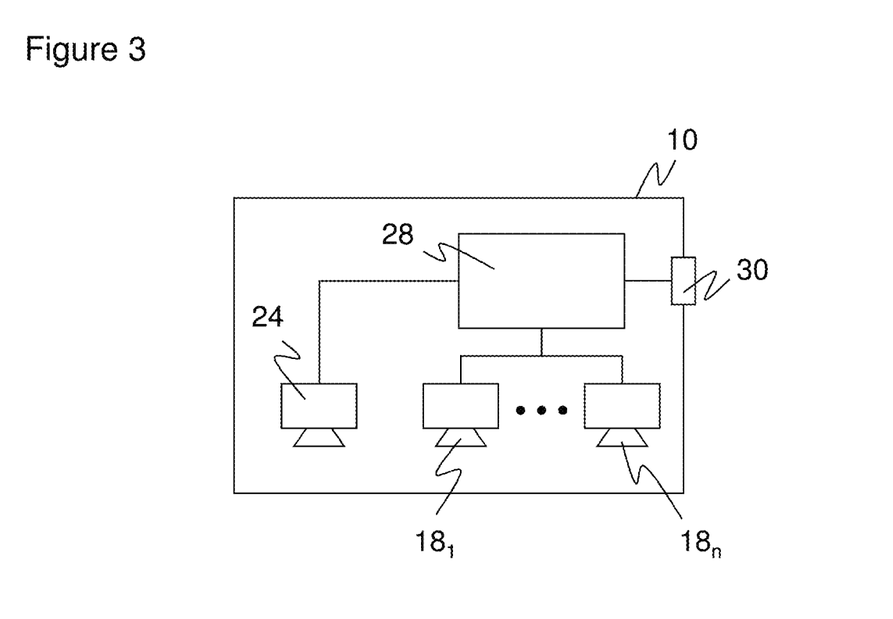
FIG. 3 a block diagram of a camera apparatus.

FIG. 3 shows the camera apparatus 10 again in a very simplified block diagram. The geometrical data determined by the geometry detection sensor 24 and the image data of the individual cameras $18_1 \ldots 18_n$ are transferred to a control and evaluation unit 28. The different data are there standardized into a common coordinate system and are evaluated. Depending on the embodiment, geometrical data or image data, parameters associated therewith, or values acquired therefrom such as polygons circumscribing objects 14 or code contents are output via an output 30 in different processing stages. The functions of the control and evaluation unit 28 can, contrary to the representation, also be distributed, that is at least some evaluation steps can already take place in the geometry detection sensor 24 or in the individual cameras $18_1 \ldots 18_n$ or conversely also only externally.

The desired output data depend on the specific embodiment and its configuration. In a preferred embodiment, the volume, also in the form of a certified volume measurement, for example with bulk goods, and/or the content of codes 16 applied to the object 14 is/are output for each object 14. Other embodiments are interested in different output values. In accordance with the invention, at least one object image is generated and provided for an output and shows the respective object 14 individually and can be associated with other output values such as a volume or code content.

The generation of this object image from frames will now be explained in more detail with reference to FIGS. 4 to 7. One basic idea here is that the geometrical data are used for the image fusion of frames to one object image. This is possible because geometrical data and image data of the frames can be associated by the already explained calibration and detection of temporal relationships. A segmentation of the objects 14 in the image data is not necessary because it takes place a lot more simply through the geometrical data. This creates the requirement for a fast object-based image fusion with a high throughput. However, it must be noted here that the object image is not required in many applications, unlike the code content, for a time-critical sorting, but is only required subsequently (video coding). The invention therefore admittedly provides the basis for a fast generation of object images that also has real time capability in principle; however, at least a certain time window is frequently also subsequently available for this.

Figure 4:
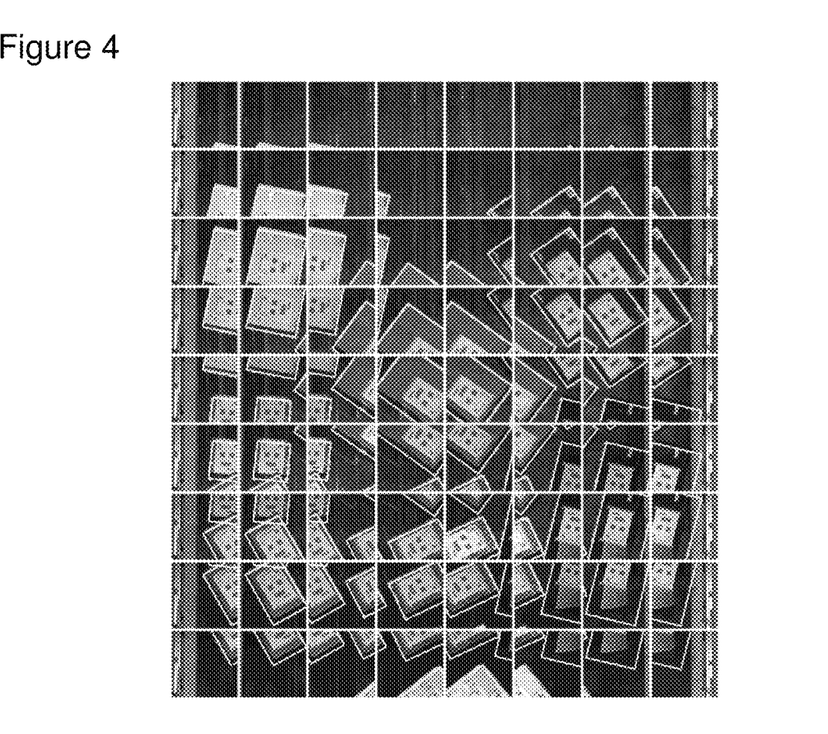
FIG. 4 exemplary image wallpaper of a sequence of already correctly arranged frames.

To explain the generation of an object image of an individual object 14 from the frames, FIG. 4 first shows as the starting point an example of frames that have been created over a certain recording period and detect a portion of the stream of the objects 14. The frames are sorted in accordance with the position of the generating individual camera $18_1 \ldots 18_n$ and the time sequence. The arrangement of the frames therefore corresponds to the situation on the conveyor belt 12 thanks to the calibration, time coordination, and coordinate transformation addressed multiple times.

FIG. 4 shows a kind of image wallpaper of frames that are stored in a ring buffer, with the image sections and in particular part views of the objects 14 occurring redundantly in a plurality of adjacent frames. In the horizontal direction, this is due to the overlap of the fields of view 20 of the individual cameras $18_1 \ldots 18_n$. In the vertical direction, the overlap and thus the redundancy are associated with the recording period of the individual cameras $18_1 \ldots 18_n$ that is at least somewhat shorter than the time the conveyor belt needs to cover a distance corresponding to the height of the frames. In principle, it would naturally be conceivable also to arranged a plurality of individual cameras $18_1 \ldots 18_n$ in the conveying direction and to generate the image wallpaper in one step or at least in fewer steps than it comprises lines of frames.

In addition to the frames, FIG. 4 also illustrates the associated geometrical data from which here a respective circumscribing rectangle was acquired for each object 14. A rectangle can be generated and used particularly simply. If the object 14 is irregularly shaped, a minimal surrounding parallelepiped (bounding box) can be used from which the rectangle is generated. Alternatively, more complicated polygons or even other geometrical shapes are naturally also possible.

The circumscribing rectangle is shown as a bright line in FIG. 4. The rectangle is not directly recognizable since it is interrupted and partially repeated by the overlaps of the frames at the transition points. The rectangle is placed in the correct manner around the objects 14 without considering the image data of the frames due to the calibration, to the known geometry of the structure of the camera apparatus 10, and to the transmission rules resulting therefrom as well as to the temporal relationships or to the advance of the conveyor belt 12. In another respect, this is only an illustration; for the fusion of object images it is a question of being able to access the image data within the rectangle directly and without their analysis.

Figure 5:
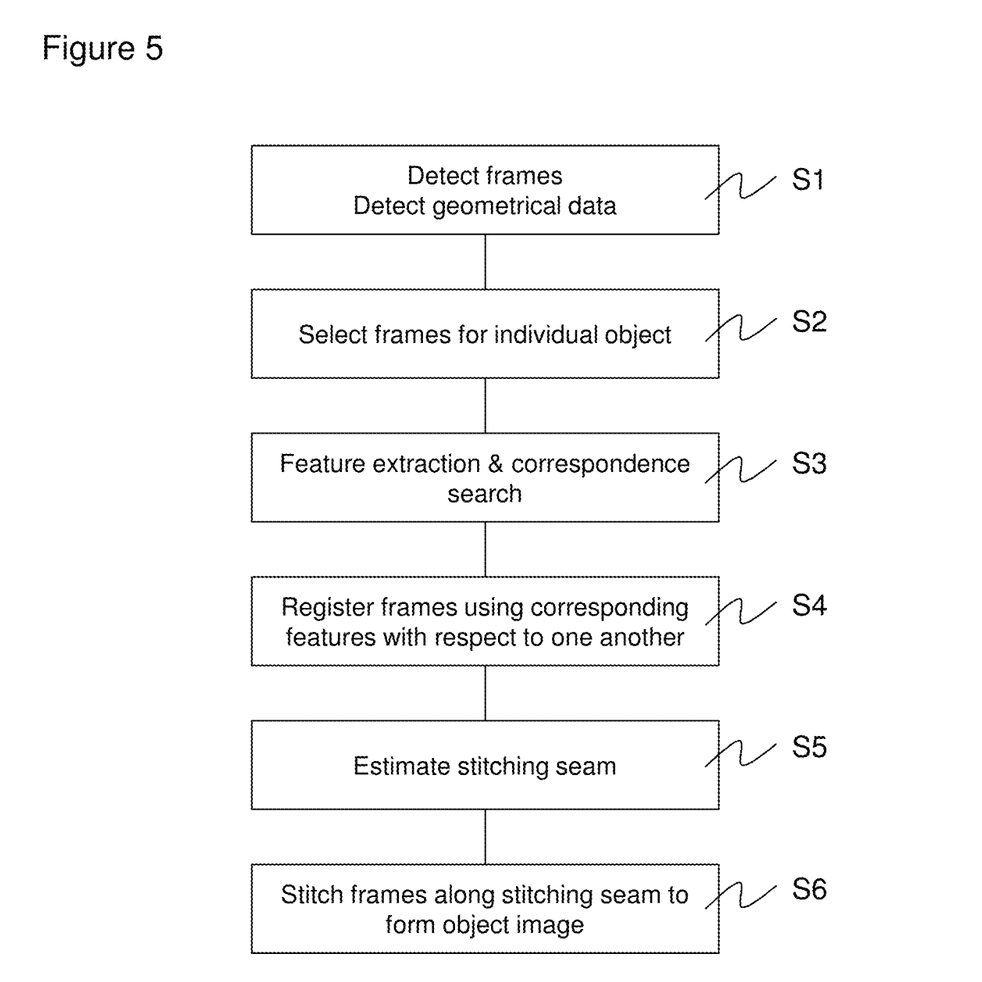
FIG. 5 a schematic flowchart for generating an object image assembled from frames with the aid of geometrical data.

FIG. 5 shows a schematic flowchart for an exemplary procedure for generating an object image assembled from frames with the aid of geometrical data.

First, in a step S1, frames are detected by the individual cameras $18_1 \ldots 18_n$ for a certain section of the stream of the objects 14 conveyed on the conveyor belt 12. Simultaneously, more precisely just before in each case with an arrangement as in FIG. 1, geometrical data are detected by means of the geometry detection sensor 24. The image data and geometrical data are transformed into a common coordinate system. The result of this step S1 is the starting point for the image fusion, as was illustrated and explained by way of example in FIG. 4 as an image wallpaper with objects 14—or with object fragments per frame—bounded by a rectangle due to geometrical data.

In a step S2, the frames are now localized from the image wallpaper that are required for an object image of the observed individual object 14. The geometrical data, that is the rectangle in the example, permit a very simple and fast decision on which frames part of this object 14 are imaged in. In some cases, the object 14 is so small that it fully fits into a frame. The fusion can then be dispensed with. Alternatively, image data in marginal regions of this frame can be improved by the image fusion.

The preselection of the frames in step S2 serves as an input for the stitching algorithm for the actual image fusion that starts in step S3. The image fusion preferably first takes place using two adjacent frames and then further frames are gradually added at the margins. It is therefore sufficient to understand how two respective starting images are connected.

Corresponding image features are sought in the starting images. Such correspondences are generally sought in all directions. The arrangement in accordance with FIG. 1, however, permits a restriction that saves a very large amount of effort and is therefore preferably used. For the individual cameras $18_1 \ldots 18_n$ are lined up next to one another and are aligned in parallel with one another. It is therefore sufficient to search for correspondences along epipolar lines, whereby the second dimension perpendicular thereto can be ignored for the correlations. In the more general case, in particular when there is no special preferred direction of the image lines of the individual cameras $18_1 \ldots 18_n$ or when nothing is known about it, the epipolar line search is also carried out in the conveying direction. A decision can be made here whether relationships of four, eight, or also all adjacent relationships should be examined by means of epipolar line geometry.

The geometrical data even permit a further simplification that likewise avoids a very large amount of effort. As can be recognized in FIG. 2, there is a connection between the object height and the possible intervals that image features recorded by different individual cameras $18_1 \ldots 18_n$ can have with respect to one another. Work is therefore preferably carried out in the correspondence search with a very narrow search window that has previously been adapted to the specific individual object 14 with the aid of the geometrical data.

In a step S4, the starting images are now registered using the feature correspondences with regard to one another found in step S3. They are therefore arranged with respect to one another such that the corresponding features lie on one another. This is naturally not perfectly possible in practice; the residual errors of the remaining intervals are rather minimized.

In a step S5, a suitable stitching seam is now sought. Generally, the starting images are already correctly disposed with respect to one another after the step S4, with redundant information of the two starting images still being present in the overlap region. It would therefore simply be possible in each pixel of the overlap region to discard the information from any one of the two starting images, to form a mean value, or the like. As a rule, however, visible fusion artifacts will thereby be present. A stitching seam is therefore preferably led through regions of the overlap region that are as low in contrast as possible. Image data of the one starting image are used for the object image on this side of the connection seam and of the other starting image at the other side. If warping occurs at the stitching seam here, it is hardly visible or at most very little information is thereby lost since the low-contrast region anyway contains hardly any information.

In a final step S6, the frames along the respective stitching seam are assembled to an object image. As already mentioned, steps S2 to S6 can also be carried out successively for a respective further frame and an arising object image.

The described steps can also be parallelized. This in particular applies to a parallel working through of the steps feature extraction S3, image registration S4, seam estimate S5, and stitching S6 for different frames. By using more powerful hardware such as multicore processors or GPUs (graphical processing units), a very high throughput can thereby be achieved and, if required, also a real time system.

Figure 6:
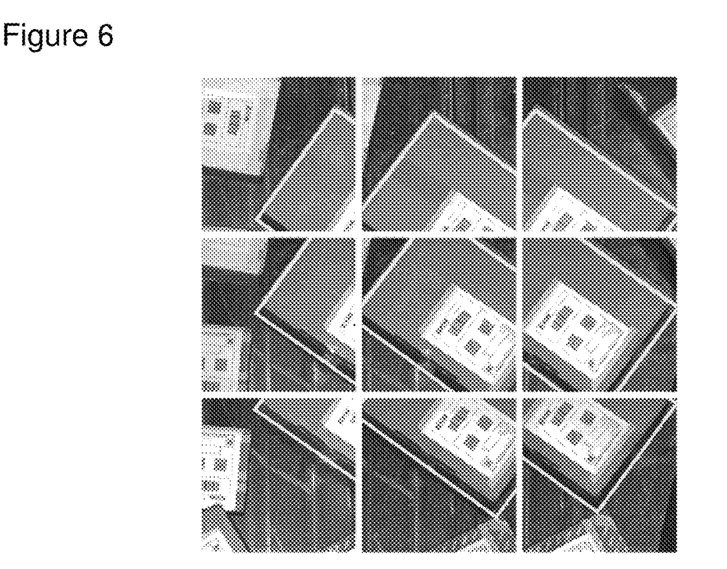
FIG. 6 an exemplary representation of the frames selected for an object image, simultaneously a detail of FIG. 4.

FIG. 6 shows by way of example to illustrate the just described routine, the frames of an individual object selected in step S2 from the image wallpaper of all the frames together with the surrounding rectangle that represents the geometrical data. This is simultaneously the section of the image wallpaper shown in FIG. 4 relevant to this object 14.

Figure 7:
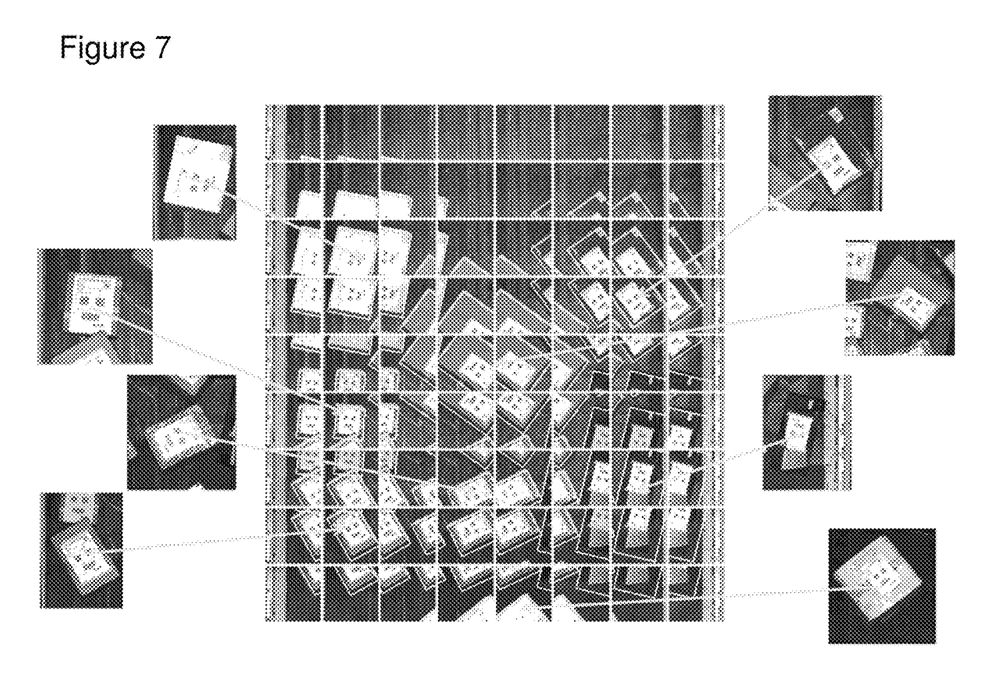
FIG. 7 an exemplary representation of object images that are assembled from frames and that are shown together with all the frames in accordance with FIG. 4 for illustration.

FIG. 7 shows the end result by way of example. The image wallpaper in accordance with FIG. 4 is again shown at the center. At the sides, object images of all the objects 14 included therein are shown after a respective image fusion, said objects being connected by a bright auxiliary line to the respective associated object in the frames of the image wallpaper.

The object images can still be subjected to a postprocessing. On the one hand, this relates to a brightness correction since the frames that were recorded by different individual cameras $18_1 \ldots 18_n$ and under certain circumstances also with different recording parameters, in particular focal positions, can differ in their brightness. It is therefore sensible to align the brightnesses or at least to provide a flowing transition at the stitching seams.

A preferred further postprocessing crops the object image to the object 14. As can be seen in FIG. 7, the object image otherwise still includes partially substantial additional image regions also with other object fragments. The position of the object 14 in the object image is known very precisely due to the geometrical data, here specifically the surrounding rectangle, so that the object can be cut out without any image processing. A defined additional marginal region around the object remains possible; this can also be solved at the level of the geometrical data without making use of the specific image data.

The object is rotated into a standardized orientation in another preferred postprocessing step. For this purpose, only the rectangle acquired from the geometrical data has to be rotated; the determination of the actual orientation of the object and thus of the required rotation is therefore completely unproblematic and independent of the specific image data. The standardized orientation is preferably flush with the horizontal or vertical direction in the case of a rectangle. The rotation is preferably associated with a cropping so that the object image itself remains rectangular overall.

If not only the flat surrounding rectangle as shown is taken into account from the geometrical data, a perspective equalization is also possible. In an embodiment, it is still a rectangle acquired from the geometrical data; however, it is now described by three-dimensional coordinates and not by two-dimensional coordinates.

Surfaces of objects 14 can thereby be taken into account that are not perpendicular to the individual cameras $18_1 \ldots 18_n$. This includes the case that the individual cameras $18_1 \ldots 18_n$ are oriented at a certain inclination to the vertical, which can, for example, be sensible due to shiny reflections. The geometrical data, however, also permit taking an irregular surface of the object 14 into account and equalizing it.

In the previously explained embodiments, the individual cameras $18_1 \ldots 18_n$ record their frames from a single perspective, for example from above. Accordingly, the object images are two-dimensional plan views of the corresponding object 14. In a further development, it is conceivable in a completely analog procedure to provide individual cameras $18_1 \ldots 18_n$ in a plurality of perspectives, for instance from the side, from the front and/or from the rear or in oblique intermediate perspectives and thus to acquire further object views. The geometrical data are of help in a very analog manner here. The geometry detection sensor 24 frequently not only delivers surrounding rectangles that are particularly simple to process, but also complete 3D contours of the objects 14. It is thus possible to prepare an object image in the form of a complete 3D model of an individual object 14. The 3D shape is known from the geometrical data. The textures for the individual surfaces are fully analogously acquired with the aid of geometrical data as has been described with reference to FIGS. 4 to 7. The object 14 can then subsequently be observed from all sides over the object image detected as a 3D model provided that individual cameras $18_1 \ldots 18_n$ have been installed in the corresponding perspective and that their frames have been evaluated.

In accordance with the invention, object images are assembled from frames on the basis of the geometrical data. Alternatively it would also be conceivable to evaluate the frames on the basis of the content to distinguish objects and the background. This form of segmentation is, however, unlike a segmentation based on geometrical data, very computation intensive and error prone. Another alternative comprises continuously fusing the frames, that is, so-to-say, the total image wallpaper of FIG. 4, and then cutting out object images of individual objects 14 from the total image. However, frames that are not actually needed due to a lack of an object 14 shown are also fused here. The segmentation problem would also not be solved; a distinction would also have to be made between the object 14 and the background on an image basis here. In principle, it is also conceivable to use focal data to draw a conclusion on objects 14 in the frames or to use a trigger in the form of an upstream sensor to at least make a suitable selection of frames for individual objects 14 in the conveying direction.

The invention claimed is:

1. A camera apparatus for detecting a stream of objects moving relative to the camera apparatus, the camera apparatus comprising:

a plurality of individual cameras that each have a matrix image sensor for recording frames, wherein the frames each cover only part, less than a full part, of a width of the stream of objects and overlap one another in part;

an evaluation unit for assembling the frames; and a geometry detection sensor for detecting geometrical data of the objects, the geometry detection sensor measuring the three-dimensional contour of the objects to detect the geometrical data based on at least one of dimensions, volume, position or shape based on the assembled frames, wherein the evaluation unit is configured to capture a part of the stream of objects as an image wallpaper by generating frames with a recording period during a recording duration and sorting the frames according to a position of a generating one of the individual cameras and a temporal order, the evaluation unit being further configured to evaluate the geometrical data obtained from the geometry detection sensor, and use the evaluation of the geometrical data to select particular ones of the frames from the image wallpaper on the basis of the geometrical data required for an object image of an individual object of the stream of objects, and assembling the object image from the selected frames.

2. The camera apparatus in accordance with claim 1, wherein the geometrical data comprise an area circumscribing the individual object.

3. The camera apparatus in accordance with claim 2, wherein the area is a rectangle circumscribing the individual object.

4. The camera apparatus in accordance with claim 1, wherein the geometrical data describe the 3D contour of the individual object.

5. The camera apparatus in accordance with claim 1, wherein the evaluation unit is configured to localize the individual object on the basis of the geometrical data.

6. The camera apparatus in accordance with claim 1, wherein the evaluation unit is configured to crop the object image to the individual object using the geometrical data.

7. The camera apparatus in accordance with claim 1, wherein the evaluation unit is configured to rotate the object image into a standardized orientation with reference to the geometrical data.

8. The camera apparatus in accordance with claim 1, wherein the evaluation unit is further configured to equalize perspective of the object image using the geometrical data.

9. The camera apparatus in accordance with claim 1, wherein the evaluation unit is configured to localize regions in the frames in which direct reflections can occur using the geometrical data.

10. The camera apparatus in accordance with claim 1, wherein the individual cameras are arranged in a row; and wherein the evaluation unit is configured to search for corresponding image features with the aid of epipolar geometry on the assembly of an object image.

11. The camera apparatus in accordance with claim 10, wherein the evaluation unit is configured to search for corresponding image features along epipolar lines.

12. The camera apparatus in accordance with claim 1, wherein the evaluation unit is configured to search for corresponding image features in a distance region on the assembly of an object image, said distance region being selected in dependence on the distance of the individual object derived from the geometrical data.

13. The camera apparatus in accordance with claim 1, wherein the evaluation unit is configured to place the stitching seam of the object image in the overlap region of two frames through image regions of as low a contrast as possible.

14. The camera apparatus in accordance with claim 1, wherein at least one individual camera is configured as a camera-based code reader.

15. A method of detecting a moving stream of objects, comprising the steps of:

recording frames with a plurality of individual cameras, each said individual camera having a matrix image sensor for recording the frames, wherein the frames each cover only part, less than a part, of a width of the stream of objects and overlap one another in part;

detecting geometrical data of the objects by using a geometry detection sensor to measure the three-dimensional contour of the objects to detect the geometrical data based on at least one of dimensions, volume, position or shape based on the assembled frames;

capturing a part of the stream of objects as an image wallpaper by generating frames with a recording period during a recording duration with an evaluation unit;

sorting the frames according to a position of a generating one of the individual cameras and a temporal order with the evaluation unit;

evaluating the geometrical data obtained from the geometry detection sensor with the evaluation unit;

using the evaluation of the geometrical data to select particular ones of the frames from the image wallpaper on the basis of the geometrical data required for an object image of an individual object of the stream of objects, the selecting being performed by the evaluation unit; and assembling the object image from the selected frames, the assembling being performed by the evaluation unit.

16. The camera apparatus in accordance with claim 1, wherein the frames from the plurality of individual cameras that each have a matrix image sensor for recording frames that overlap one another in part, in the vertical direction and the horizontal direction, such that the frames from the image wallpaper overlap and thus present a matrix image with a redundancy are associated with a recording period of the individual cameras.

17. The camera apparatus in accordance with claim 1, wherein the frames from the plurality of individual cameras that each have a matrix image sensor for recording frames that overlap one another in part, in the vertical direction and the horizontal direction, such that the frames from the image wallpaper overlap and thus present a matrix image with a redundancy are associated with a recording period of the individual cameras.

* * * * *

UNITED STATES PATENT AND TRADEMARK OFFICE
CERTIFICATE OF CORRECTION

PATENT NO. : 11,087,484 B2
APPLICATION NO. : 16/043292
DATED : August 10, 2021
INVENTOR(S) : Carl Hafner and Stephan Walter Page 1 of 1

It is certified that error appears in the above-identified patent and that said Letters Patent is hereby corrected as shown below:

In the Claims

Claim 15, Column 14, Line 4, please delete the phrase "less than a part" and replace with "less than a full part".

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*